Oct. 13, 1936.   E. FAVRE   2,057,516
LAY-OUT, CHECKING, AND FINISHING TOOL
Filed May 8, 1933   3 Sheets-Sheet 1
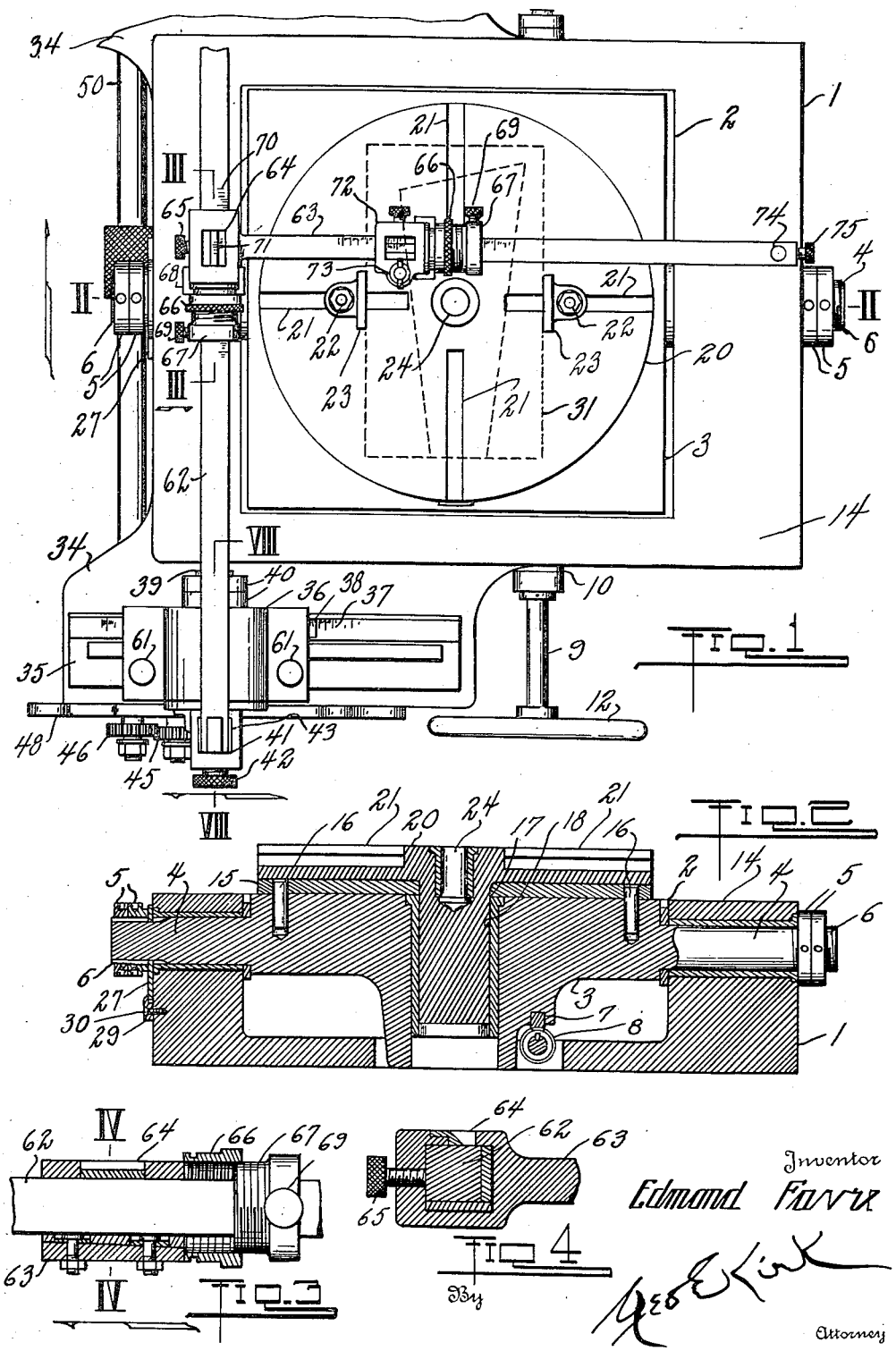
Inventor
Edmond Favre
By
Attorney

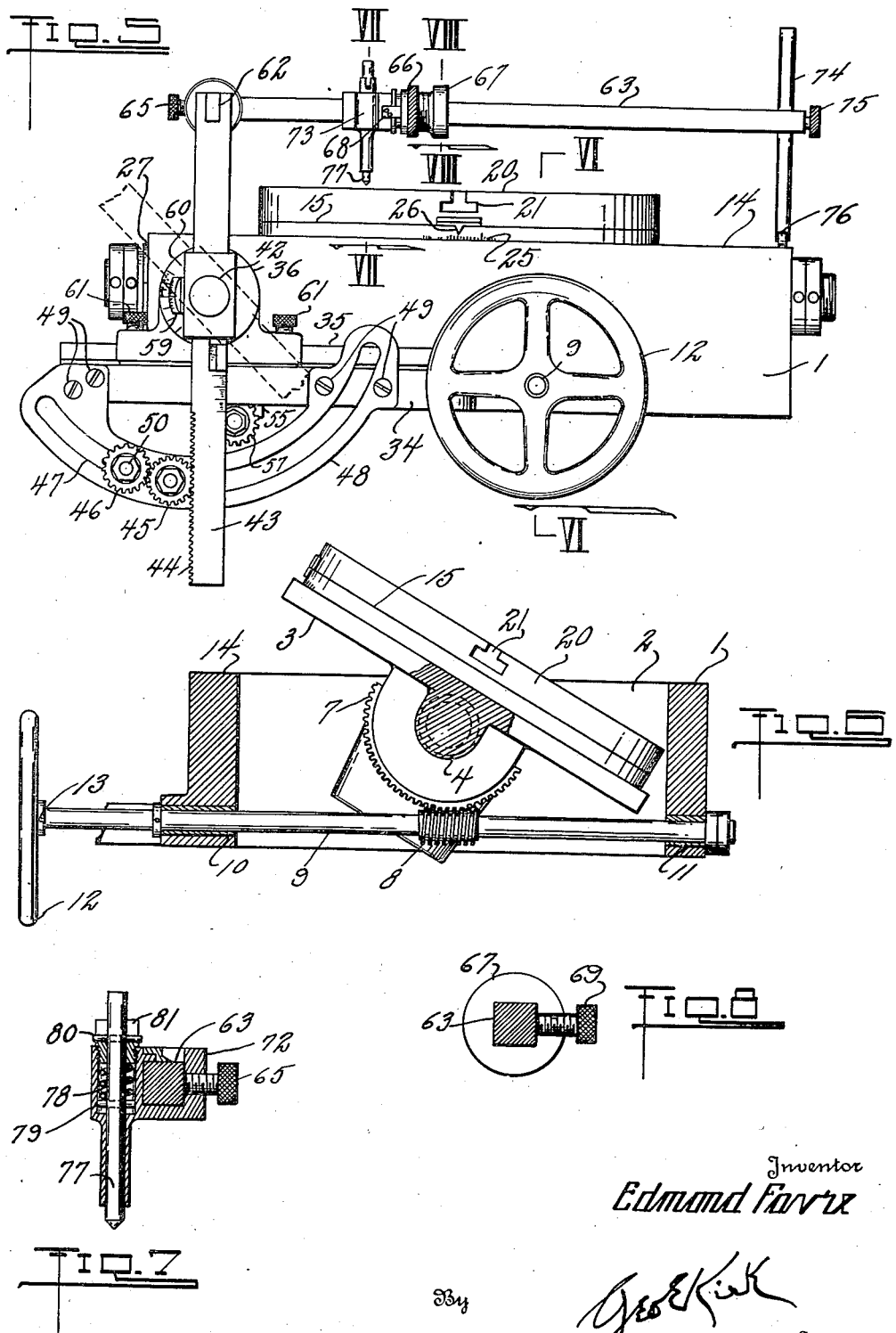

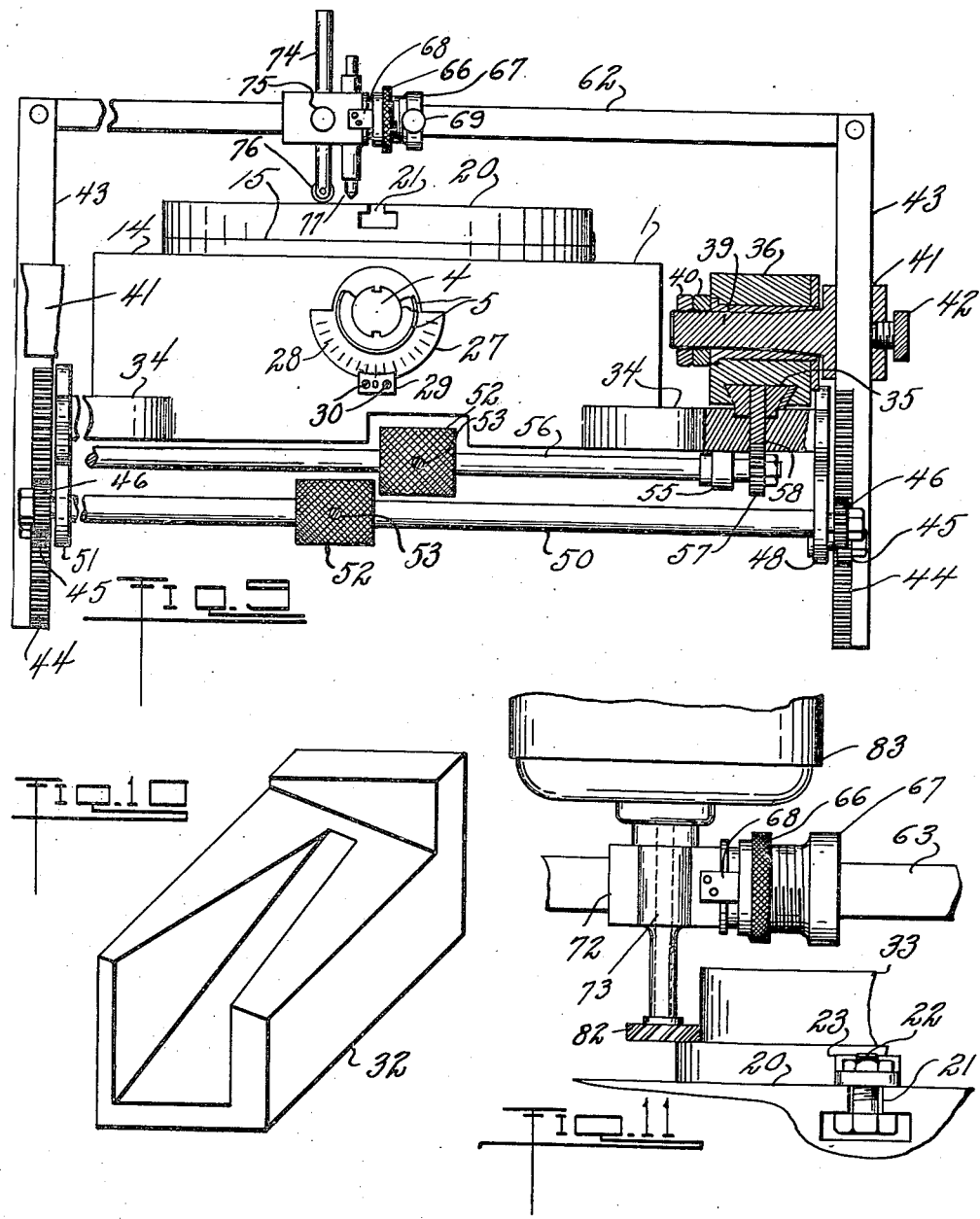

Patented Oct. 13, 1936

2,057,516

UNITED STATES PATENT OFFICE 2,057,516

LAY-OUT, CHECKING, AND FINISHING TOOL

Edmond Favre, Toledo, Ohio

Application May 8, 1933, Serial No. 669,850

10 Claims. (Cl. 33—174)

This invention relates to inspection and layout equipment, especially for complex forms or bodies.

This invention has utility when incorporated in a shiftable support or carrier for work and an independently shiftable support or carrier for a tool, more particularly as to each having a plurality of directions for shiftings.

Referring to the drawings:

Fig. 1 is a plan view of an embodiment of the invention;

Fig. 2 is a section on the line II—II, Fig. 1;

Fig. 3 is a section on the line III—III, Fig. 1;

Fig. 4 is a section on the line IV—IV, Fig. 3;

Fig. 5 is a side view of the device of Fig. 1;

Fig. 6 is a section on the line VI—VI, Fig. 5;

Fig. 7 is a section on the line VII—VII, Fig. 5;

Fig. 8 is a section on the line VIII—VIII, Fig. 5;

Fig. 9 is a view from the left of Fig. 1 and in partial section on the line VIII—VIII, in said Fig. 1;

Fig. 10 is a perspective view of an object to be checked or finished; and

Fig. 11 is a detail view of an operating tool effective instead of an exploratory point.

Base 1 provides a main frame having central opening 2 therein. In this central opening 2 is member 3, herein shown as a rectangular deck or platform having trunnions 4 in the frame 1 as pivot bearings for this member 3. Nuts 5 on threaded portions 6 determine adjustment for this platform member 3 in desired angles of tilt or lack of tilt as to the base 1.

This member 3 carries worm section 7 with which may coact worm 8 on shaft 9 mounted in bearings 10, 11, in the base 1 and extending to have hand wheel 12 anchored therewith by set screw 13. By rotating this hand wheel 12 there may be given an angular shifting of the deck 3 relatively to plane upper face 14 of the base 1 and out of the plane of such base. This deck member 3 has thereon disk 15 anchored against rotation relatively to the member 3 by pins 16. This disk has a central opening 17, therethrough in register with central bearing 18 of the member 3, thus to carry disk or table 20 having radially extending key ways 21 which provide seats for bolts 22 in anchoring fittings 23 for thereby clamping an article of work. Additionally, this central turn table 20 may have axis seat 24 (Fig. 2) for convenience in locating as centering certain types of work. The disk 15 may be provided with graduations 25 (Fig. 5), and pointer 26 to cooperate therewith, thus locating angular shifting for the table 20 relatively to the disk 15.

The tilt of the deck 3 as to the base 1 may also be indicated, for on one of the trunnions 4 there may be clamped by the nuts 5 plate 27 (Figs. 2, 9) carrying graduations 28 for disclosing angular shifting indication as to pointer 29, anchored by screws 30 with the base 1. It is thus seen that as a support for article 31, 32, 33, or other item for service attention, exploration, checking or inspection, there is provided anchoring to a carrier or support which is one accurately controlled in adjustments in two intersecting directions as to the ways 21. Due to the trunnions 4 a third adjustment may be effected. It is thus seen that scaling of points as to length, breadth, and thickness locations on an article of work may be carried through at the turn table 20.

This adjustment may be available for relocation by recording the scale readings for the graduations 25 at the disk 15 and the graduations 28 at the protractor 27. The hand wheel 12 may be manipulated for most minute adjustments as well as accuracy in reading with the worm serving as a friction lock for such position. The extensive frictional face between the disk 15 and the turn table 20 may cooperate for frictionally locking in the adjusted position as disclosed by the scale 25.

The frame 1 is provided with extensions 34 for way 35 as a mounting for bearing 36. There are here provided graduations 37, 38, for vernier cooperation. This bearing 36 (Fig. 9) mounts stub shaft 39 adjusted therein by nuts 40. This shaft carries an extension having transverse opening 41 therein with which may cooperate set screw 42 in locking rectangular bar 43 for a range of adjustments radially of this bearing 36. This rectangular bar 43 is shown extending two ways out of this stub shaft block having the way 41. As extending therefrom, the side away from the turn table 20 of this rectangular bar 43 has tooth portion 44 with which may coact intermediate pinion 45 as actuated by pinion 46 cooperating in arc 47 of bracket 48 anchored by screws 49 with the extension 34 of base 1. This pinion 46 is fixed on shaft 50 extending to cooperating guide arc 51 on the opposite side of the base 1 from the arc plate 48. This shaft 50 intermediate its length carries knurled grip 52 anchored therewith by set screw 53 permitting an operator as in position at the machine to effect the desired vertical adjustment of the bar 43 when the set screw 42 has been released.

This base 1 adjacent the shaft 50 is provided with bosses 55, mounting shaft 56 parallel to the shaft 50. This shaft 56 carries the grip 52 with set screw 53 anchored therewith so that rotation of the knurled grip 52 on the shaft 56 may, through pinion 57 on the shaft 56 as in mesh with rack 58, coact with the block or bearing 36 for shifting such along the way 35 to the position as disclosed by the vernier graduations 37, 38. The inclination of the bar 43 from vertical may be disclosed by vernier graduations 59 fixed with the stub shaft 39 for coaction with protractor graduations 60 fixed with the bearing 36. Screws 61 may be adjusted to take up lost motion or effect anchoring in the adjusted position for this bearing 36 along a way 35.

Fixed at the upper free end of this bar 43 is angularly extending bar 62. This bar 62 has thereon angularly extending arm 63 having transverse way 64 seating on the bar 62. Set screw 65 is effective for anchoring this arm 63 with the arm 62. In instances for definite adjustment between the bar 62 and the arm 63, threaded member 66 may be rotated as to threaded member 67 having interlocking connection 68 with the portion 64 of the arm 63. This adjustment may occur when the set screw 65 is released and the set screw 69 held with the section 67 effective for the adjustment. There is thus accurate determination of position between the arms 62, 63, as shown by vernier graduations 70, 71.

This arm 63 additionally carries analogous assembly of adjustment means for auxiliary fitting 72 having eccentrically thereon seat 73 coacting for zero position along the arm 62. Steadying means may be provided for this arm 63 by post 74 clamped by set screw 75 so that roller 76 may ride upon the face 14 of the base 1. This steady operation is of course one which may be effective as the arm 63 is in use parallel to the face 14. In these operations there may be occasion for varying the clearance between the base face 14 and the arm 63. These can be cared for by backing off the set screws 75 and 42 with the operation of the grip 52 on the shaft 50. Traverse over the table 20 may be determined by shifting of the bearing 36 or shifting the fitting 72 along the arm 63; each of these being adjustments for vernier location with the resultant accuracy of position therefrom.

In articles of work hereunder, say for exploratory or observation purposes, seat 73 may locate pointer 77 (Fig. 7) normally yieldably thrust in a predetermined position relatively to the fitting 72 by compression helical spring 78 acting against bar 79. At this position, cross pin 80 is in slot 81. For shifting the work or other purpose wherein it may be desired to have the pin 77 clear, it is only necessary to pull the pin 77 upward and rotate such to bring the cross pin 80 out of the slot 81 when the spring 78 will hold the pin in the retracted position.

It is to be noted that this arm 63, while it has provision in the bearing 36 and along its length 63 for locating the seat 73 in one line, there is additional provision for locating this seat 73 in positions in the full range transversely of such line as to the table 20 by the adjustment of the arm 63 along the bar 62. Additionally, there is the clearance relatively to the table 20 effected by the shifting of the bar 43 through the seat 41. With locking effective at the seat 41 by the screw 42, there may be angular shifting on the stub shaft as an axis, thus determining a plane for these two travel positions of the seat 73, which plane is at an angle to the face 14 of the base or the turntable 20 as parallel to such base. It thus follows that by this rocking for the seat 73 in the ranges of adjustment for location thereof, coupled with the turn table 20 as to its shifting on the pivot bearing 18 and its rocking on the trunnions 4, there is a range of location of planes as diverse as in the work 32 (Fig. 10) which may be explored in determining the degree of plane for the respective faces, as well as their dimensional extent. This exploration work may be of a character to check a pattern as to a drawing; may be to check a product as to production identities, and it may be definite working or a final finishing as by grinding wheel 82 (Fig. 11) located in the seat 73; this grinding wheel 82 being driven by motor 83. The calibrations may be noted or identified for checking with specifications or drawings or for recording for providing data for specifications or drawings. These identifications or calibrations thus establish identity for dimensions and contours of the object, whether it be for identification or reproduction information. However, the survey or contacting tool or point may have substituted therefor a working tool, say as a rotary type, as the grinding wheel 82. With specifications or drawings to dictate the calibration to follow, there may be marks or locations defined on a block or rough ashlar for the more or less complex die or finished product.

It is to be noted that in operation hereunder, wherein there is cooperative relation between the article, such as pattern for a die, carried on the table 20 and the article, such as contact tool, from the arm 63, the table 20 may be rotated upon its axis or bearing 18 to describe an arc or circle in the defining of relations between the articles whether in production or survey, and this may operate for a line or surface. Furthermore, in the cooperation between the articles, an arc line or a surface may also be given a cooperative relation for work or survey by shifting of the arm 63 relative to the table 20 upon the axis 39.

As a feature in maintaining accuracy hereunder, it is important that while there are permitted the movements for adjustment, there be absence of lost motion to introduce disturbing factors in the measurements. This is cared for by definitely locating the parts and adjusting the clearance, whether as by nuts 5 on the trunnions 4 or by bushings or beveled shims as shown in Figs. 3, 4.

As indicated by dotted lines 31 (Fig. 1), an object of unsymmetrical form may be located on the carrier 21. With this object 31 of lesser thickness at the lower right hand corner and tapering therefrom toward the upper left hand corner, there is a surface for survey. The table 20 may be turned on the swivel axis 24 and the trunnions 4 for locating such surface of the work to lie in a plane parallel to the axis of the bearing 36. This plane of the work may be checked by cooperating tool 76. The channel way in the object 32 tapering rearward (Fig. 10) may be checked by tilting of the carrier for the tool 76, so the tool may be moved in a plane and that the plane of a side of this channel or readings thus providing vertification for, say working drawings. Exceptional value is present from these tiltings in the combination, for thereby may be located axes of generation of curved surfaces, as well as the direction for such axes. This may be a checked form from an article, or as to whether properly conforming to drawings or specifications, or the object may be generated by a tool placed as to the calibrations from a drawing.

What is claimed and it is desired to secure by Letters Patent is:

1. A tool adapted to survey an article for configuration as made or to be made, said tool comprising a base frame, a pair of carriers, each carrier being provided with means for anchoring an article therewith, independent rockably adjustable mounting means having bearings providing a plurality of axes respectively in angular relation to each other, said mounting means assembling the carriers with the frame, and lineally shiftable location determining means between the frame and carriers controllable for bringing the respective carriers as to the mounting means each in predetermined positions relatively to the frame for progressive point contact cooperation between the anchored articles, one of the lineal means including mechanism for defining progress of one carrier in a straight line across the extent of a portion of the other carrier.

2. A survey tool for an article having length, breadth and thickness, said tool comprising a base frame, a carrier on the frame provided with means for anchoring an article of work therewith, adjustable multiplane turnable mounting means assembling the carrier relatively to the frame, indicating means between the frame and carrier having the function of identifying the position of adjustment, a second carrier on the frame provided with means for anchoring a tool therewith, adjustable mounting means assembling the second carrier in a predetermined position relatively to the frame and in cooperation with the work, and indicating means between the frame and second carrier having the function of identifying the position of the second carrier adjustment, said mounting means including lineal adjustment mechanism for progressing a tool in a straight line across the extent of the work transversely of the base frame.

3. A survey tool for articles comprising a base frame, a first carrier on the frame provided with means for anchoring an article of work therewith, first adjustable mounting means assembling the first carrier in a predetermined position relatively to the frame, a second carrier on the frame provided with means for anchoring a tool therewith, second adjustable mounting means assembling the second carrier in a predetermined position relatively to the frame and in cooperation with the work, said mounting means including a tiltable bearing having an axis, and slide mounting means therewith intersecting said axes, said slide mounting means being effective in different directions and adapted to bring the tool and work into contacting relation at the predetermined positions.

4. A survey tool for articles of work, said tool comprising a base frame, a first carrier on the frame provided with means for anchoring an article of work therewith, first adjustable mounting means assembling the first carrier in a predetermined position relatively to the frame, a second carrier on the frame provided with means for anchoring a tool therewith, second adjustable mounting means assembling the tool carrier in a predetermined position relatively to the frame and in cooperation with the work, said mounting means including three angular adjustment means cooperating in contacting the tool on the tool carrier with work on the work carrier assembled between the frame and the respective carriers, two of said angular adjustment means having their axes intersect and adjustment means for each carrier, said means being radial from an angular adjustment axis.

5. A survey tool comprising a base frame, a first carrier on the frame provided with means for anchoring an article of work therewith, first adjustable mounting means assembling the first carrier in an identifiable position relatively to the frame, a second carrier on the frame provided with means for anchoring a tool therewith, and second adjustable mounting means assembling the tool carrier in an identifiable position relatively to the frame and in cooperation with the work, each of said mounting means including linear and angular adjustment means cooperating in contacting the tool on the tool carrier with work on the work carrier at the identifiable positions assembled between the frame and the respective carriers.

6. A survey tool comprising a base frame, a carrier on the frame having a deck providing a supporting plane, means for anchoring an article of work with the deck, swivel mounting means for said deck, rockable mounting means for the deck having its axis intersect the axis of the swivel mounting means, and a tool carrier on the frame having a mounting means definitely locating the tool as to said frame for cooperating with said work, there being linear adjustment means for the tool effective transversely of the extent of the deck as a carrier.

7. A survey tool comprising a base frame, a carrier on the frame provided with means for anchoring the tool therewith, a work carrier on the frame, position identifying adjustable mounting means operable to bring the work for a plane relation different from its carrier and definitely as to the frame, and independently adjustable means for locating the tool for coplanar cooperation therewith, said adjustable means including between the frame and carriers four slides and three turning devices for the respective carriers, two of each of said devices being in series.

8. A survey tool comprising a base frame, a carrier on the frame, pivotal mounting means for the carrier, anchoring means for a first article with the carrier, including assembly means adjustable radially along the first mounting means, a primary arm rockably adjustable relatively to the frame and mounted thereon, a secondary arm movable with said primary arm and additional mounting means providing lineal adjustment for the secondary arm relatively to the primary arm, a tertiary arm carried by the secondary arm for mounting a second article, and cooperating means between the secondary and tertiary arms for locating the second article as to said first article.

9. A survey tool comprising a base frame, a primary pivotal mounting means on the frame, secondary swivel mounting means on the primary mounting means having its axis intersect the axis of the primary mounting means, in addition to said primary and secondary mounting means a pair of intersecting direction slide mounting means in series on the frame, and cooperating means mounted on a slide mounting means and adapted to come to position adjacent an article on the secondary mounting means.

10. Survey apparatus comprising a base frame, a first member having diametrically disposed trunnions, said frame having bearings for supporting said trunnions, operating means in the frame for rocking said first member in the bearings and relatively to the frame, a circular member, bearing means mounting the circular member on a central axis transversely and medially of the extent of the axis of the first member, diametrically disposed adjustable holder means on the circular member, a pedestal mounted by the frame laterally of the members, operating means for adjusting the pedestal as to the members, a bar having bearing assembly with the pedestal along one side from the members, actuating means for rocking the bar on an axis through the pedestal, a radially extending arm mounted for adjustment along the bar and to extend to oppose the members, and, transversely of the arm and adjustable longitudinally therealong, a holder adapted for location in proximity to the holder means, whereby there may be cooperation between tool and work as mounted by the holder and holder means.

EDMOND FAVRE.